US011911867B2

(12) United States Patent
Kimba et al.

(10) Patent No.: US 11,911,867 B2
(45) Date of Patent: Feb. 27, 2024

(54) POLISHING APPARATUS AND POLISHING METHOD

(71) Applicant: EBARA CORPORATION, Tokyo (JP)

(72) Inventors: Toshifumi Kimba, Tokyo (JP); Masaki Kinoshita, Tokyo (JP); Yoichi Shiokawa, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 583 days.

(21) Appl. No.: 16/039,065

(22) Filed: Jul. 18, 2018

(65) Prior Publication Data
US 2019/0022820 A1 Jan. 24, 2019

(30) Foreign Application Priority Data
Jul. 24, 2017 (JP) .................................. 2017-142578

(51) Int. Cl.
*B24B 37/005* (2012.01)
*B24B 49/12* (2006.01)
*G01B 11/06* (2006.01)

(52) U.S. Cl.
CPC ............ *B24B 37/005* (2013.01); *B24B 49/12* (2013.01); *G01B 11/0625* (2013.01); *G01B 11/0683* (2013.01)

(58) Field of Classification Search
CPC ..... B24B 37/005; B24B 37/013; B24B 37/04; B24B 37/10; B24B 37/20; B24B 37/107;
(Continued)

(56) References Cited

U.S. PATENT DOCUMENTS 4,045,668 A * 8/1977 Pitt ........................... G01F 1/74
250/227.25
2004/0242121 A1 12/2004 Hirokawa et al.
(Continued)

FOREIGN PATENT DOCUMENTS

CN 101372090 A 2/2009
CN 101391397 A 3/2009
(Continued)

OTHER PUBLICATIONS

Singapore Patent Application No. 10201806039Q; Search Report; dated Aug. 5, 2020; 3 pages.

*Primary Examiner* — Eric J Rosen
*Assistant Examiner* — Michael A Gump
(74) *Attorney, Agent, or Firm* — BakerHostetler

(57) ABSTRACT

A polishing apparatus which can measure a film thickness with high accuracy without affecting a polishing rate of a wafer is disclosed. The polishing apparatus includes: a polishing head configured to press a wafer against a polishing pad; an illuminating fiber having a distal end disposed in a flow passage formed in the polishing table; a spectrometer configured to resolve reflected light from the wafer in accordance with wavelength and measure an intensity of the reflected light at each of the wavelengths; a light-receiving fiber having a distal end disposed in the flow passage; a liquid supply line communicating with the flow passage; a gas supply line communicating with the flow passage; a liquid supply valve attached to the liquid supply line; a gas supply valve attached to the gas supply line; and an operation controller configured to control operations of the liquid supply valve and the gas supply valve.

3 Claims, 7 Drawing Sheets

(58) Field of Classification Search
CPC ..... B24B 37/205; B24B 49/003; B24B 49/04; B24B 49/045; B24B 49/08; B24B 49/12; G01B 11/06; G01B 11/0625; G01B 11/0683; G01N 2021/154
USPC .................................. 451/5, 6, 41, 287, 910
See application file for complete search history.

(56) References Cited

U.S. PATENT DOCUMENTS

| | | | |
|---|---|---|---|
| 2007/0173177 | A1 | 7/2007 | Hirokawa et al. |
| 2014/0220864 | A1* | 8/2014 | Kawahara ............ B24B 37/345 451/24 |
| 2015/0017887 | A1* | 1/2015 | Kobayashi ......... G01B 11/0683 451/59 |
| 2015/0364390 | A1 | 12/2015 | Benvegnu et al. |
| 2016/0346902 | A1* | 12/2016 | Toyomura ............... B24B 37/04 |
| 2017/0162409 | A1* | 6/2017 | Toyomura ........... H01L 21/6838 |

FOREIGN PATENT DOCUMENTS

| | | | | |
|---|---|---|---|---|
| CN | 102194690 | A | | 9/2011 |
| CN | 103072072 | A | | 5/2013 |
| CN | 103624673 | A | | 3/2014 |
| CN | 103962937 | A | | 8/2014 |
| CN | 104275642 | A | | 1/2015 |
| CN | 204988999 | U | | 1/2016 |
| CN | 205520892 | U | | 8/2016 |
| CN | 106239352 | A | | 12/2016 |
| JP | 61126427 | A * | 6/1986 | ........... G02B 6/3807 |
| JP | 2009-302577 | A | | 12/2009 |
| JP | 2012-115960 | A | | 6/2012 |
| JP | 2012115960 | A * | 6/2012 | |
| JP | 2015-016529 | A | | 1/2015 |
| JP | 2017-005014 | A | | 1/2017 |
| KR | 20110016706 | A * | 2/2011 | |
| KR | 2013-0117334 | A | | 10/2013 |

* cited by examiner

POLISHING APPARATUS AND POLISHING METHOD

CROSS REFERENCE TO RELATED APPLICATION

This document claims priority to Japanese Patent Application Number 2017-142578 filed Jul. 24, 2017, the entire contents of which are hereby incorporated by reference.

BACKGROUND

Semiconductor devices are manufactured through several processes including a process of polishing a dielectric film, e.g., $SiO_2$, and a process of polishing a metal film, e.g., copper or tungsten. Manufacturing processes of backside illumination CMOS sensor and through-silicon via (TSV) include a process of polishing a silicon layer (silicon wafer), in addition to the polishing processes of the dielectric film and the metal film. Polishing of the wafer is terminated when a thickness of a film (e.g., the dielectric film, the metal film, or the silicon layer), constituting a wafer surface, has reached a predetermined target value.

Polishing of the wafer is carried out by using a polishing apparatus. In order to measure a thickness of a non-metal film such as a dielectric film or a silicon layer, the polishing apparatus is generally provided with an optical film-thickness measuring device. The optical film-thickness measuring device is configured to detect a thickness of a film of the wafer by directing light from an optical sensor, which is comprised of distal ends of optical fibers, to the surface of the wafer, receiving reflected light from the wafer with the optical sensor, and analyzing a spectrum of the reflected light. During polishing of the wafer, the optical sensor is held in a flow of pure water in order to prevent a slurry from adhering to the optical sensor.

However, in some cases, the slurry may be diluted with the pure water during polishing of the wafer, resulting in a local decrease in polishing rate of the wafer.

SUMMARY OF THE INVENTION

According to embodiments, there are provided a polishing apparatus and a polishing method which can measure a thickness of a film with high accuracy without affecting a polishing rate of a wafer.

Embodiments, which will be described below, relate to a polishing apparatus and a polishing method for polishing a wafer having a film formed on a surface thereof, and more particularly to a polishing apparatus and a polishing method for polishing a wafer while detecting a film thickness of the wafer by analyzing optical information contained in a reflected light from the wafer.

In one aspect, there is provided a polishing apparatus comprising: a polishing table for supporting a polishing pad; a polishing head configured to press a wafer against the polishing pad; a light source configured to emit light; an illuminating fiber coupled to the light source and having a distal end disposed in a flow passage formed in the polishing table; a spectrometer configured to resolve reflected light from the wafer in accordance with wavelength and measure an intensity of the reflected light at each of the wavelengths; a light-receiving fiber coupled to the spectrometer and having a distal end disposed in the flow passage; a processor configured to determine a film thickness of the wafer based on a spectral waveform indicating a relationship between intensity and wavelength of the reflected light; a liquid supply line communicating with the flow passage; a gas supply line communicating with the flow passage; a liquid supply valve attached to the liquid supply line; a gas supply valve attached to the gas supply line; and an operation controller configured to control operations of the liquid supply valve and the gas supply valve.

In one aspect, the polishing apparatus further comprises an ultrasonic transducer disposed in the flow passage.

In one aspect, there is provided a polishing method comprising: rotating a polishing table supporting a polishing pad; polishing a wafer by pressing the wafer against the polishing pad while supplying a slurry onto the polishing pad; directing light from an illuminating fiber to the wafer and receiving reflected light from the wafer with a light-receiving fiber during polishing of the wafer, a distal end of the illuminating fiber and a distal end of the light-receiving fiber being located in a flow passage formed in the polishing table; determining a film thickness of the wafer based on a spectral waveform indicating a relationship between intensity and wavelength of the reflected light; and bringing a liquid and a gas alternately into contact with the distal end of the illuminating fiber and the distal end of the light-receiving fiber during polishing of the wafer.

In one aspect, the gas is brought into contact with the distal end of the illuminating fiber and the distal end of the light-receiving fiber when the distal end of the illuminating fiber and the distal end of the light-receiving fiber are located under the wafer, and the liquid is brought into contact with the distal end of the illuminating fiber and the distal end of the light-receiving fiber when the distal end of the illuminating fiber and the distal end of the light-receiving fiber are not located under the wafer.

In one aspect, the gas is brought into contact with the distal end of the illuminating fiber and the distal end of the light-receiving fiber when the distal end of the illuminating fiber and the distal end of the light-receiving fiber are not located under the wafer, and the liquid is brought into contact with the distal end of the illuminating fiber and the distal end of the light-receiving fiber when the distal end of the illuminating fiber and the distal end of the light-receiving fiber are located under the wafer.

In one aspect, an ultrasonic transducer disposed in the flow passage is cause to vibrate when the flow passage is filled with the liquid.

In one aspect, there is provided a polishing method comprising: rotating a polishing table supporting a polishing pad; polishing a wafer by pressing the wafer against the polishing pad while supplying a slurry onto the polishing pad; directing light from an illuminating fiber to the wafer and receiving reflected light from the wafer with a light-receiving fiber during polishing of the wafer, a distal end of the illuminating fiber and a distal end of the light-receiving fiber being located in a flow passage formed in the polishing table; determining a film thickness of the wafer based on a spectral waveform indicating a relationship between intensity and wavelength of the reflected light; and bringing a liquid having a higher refractive index than water into contact with the distal end of the light-receiving fiber during polishing of the wafer.

According to the above-described embodiments, the gas and the liquid can be switched therebetween during polishing of a wafer. Since the gas does not dilute the slurry, the polishing apparatus can measure a thickness of a film with high accuracy without decreasing a polishing rate of the wafer.

DESCRIPTION OF THE EMBODIMENTS

Figure 1:
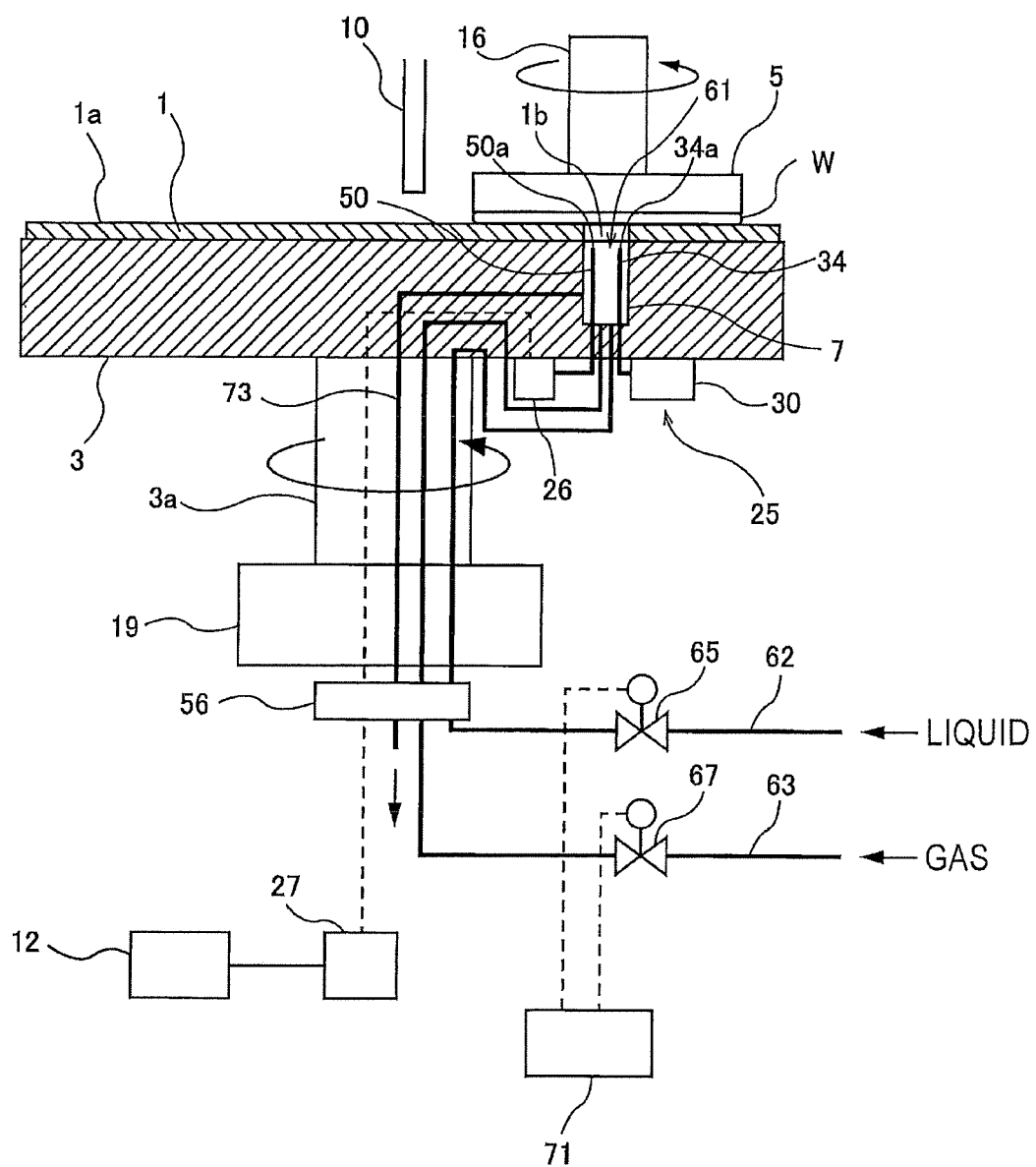
FIG. 1 is a diagram showing a polishing apparatus according to an embodiment.

Embodiments will now be described with reference to the drawings. FIG. 1 is a diagram showing a polishing apparatus according to an embodiment. As shown in FIG. 1, the polishing apparatus includes a polishing table 3 that supports a polishing pad 1, a polishing head 5 for holding a wafer W and pressing the wafer W against the polishing pad 1 on the polishing table 3, a slurry supply nozzle 10 for supplying a slurry onto the polishing pad 1, and a polishing controller 12 for controlling polishing of the wafer W.

The polishing table 3 is coupled via a table shaft 3a to a table motor 19 which is disposed below the polishing table 3, so that the polishing table 3 can be rotated by the table motor 19 in a direction indicated by arrow. The polishing pad 1 is attached to an upper surface of the polishing table 3, and an upper surface of the polishing pad 1 constitutes a polishing surface 1a for polishing the wafer W. The polishing head 5 is coupled to a lower end of a polishing head shaft 16. The polishing head 5 is configured to be capable of holding the wafer W on a lower surface thereof by vacuum suction. The polishing head shaft 16 is vertically movable by means of a not-shown vertically-moving mechanism.

Polishing of the wafer W is performed in the following manner. While the polishing head 5 and the polishing table 3 are rotating in the respective directions indicated by the arrows and while the slurry supply nozzle 10 is supplying the slurry onto the polishing pad 1, the polishing head 5 presses the wafer W against the polishing surface 1a of the polishing pad 1. The surface of the wafer W is polished by the chemical action of the slurry and the mechanical action of abrasive particles contained in the slurry.

The polishing apparatus includes an optical film-thickness measuring device (i.e., a film-thickness measuring apparatus) 25 for measuring a film thickness of the wafer W. The film-thickness measuring device 25 includes a light source 30 for emitting light, an illuminating fiber 34 having a distal end 34a disposed at a predetermined position in the polishing table 3, a light-receiving fiber 50 having a distal end 50a disposed at the predetermined position in the polishing table 3, a spectrometer 26 configured to decompose reflected light from the wafer W in accordance with wavelength and measure intensity of the reflected light at each wavelength, and a processor 27 configured to produce a spectral waveform indicating a relationship between the intensity and the wavelength of the reflected light to determine a film thickness of the wafer W based on the spectral waveform. The spectrometer 26 is electrically connected to the processor 27, and the processor 27 is electrically connected to the polishing controller 12.

The distal end 34a of the illuminating fiber 34 and the distal end 50a of the light-receiving fiber 50 are disposed in a flow passage 7 formed in the polishing table 3. The distal end 34a of the illuminating fiber 34 and the distal end 50a of the light-receiving fiber 50 are located adjacent to each other and constitute an optical sensor 61. The polishing pad 1 has a through-hole 1b located above the optical sensor 61 so that the optical sensor 61 can direct the light to the wafer W on the polishing pad 1 and can receive the reflected light from the wafer W through the through-hole 1b.

In one embodiment, the illuminating fiber 34 may have a plurality of distal ends located at different positions in the polishing table 3. Similarly, the light-receiving fiber 50 may have a plurality of distal ends located at the different positions in the polishing table 3. Also in this case, each distal end of the illuminating fiber 34 and a corresponding distal end of the light-receiving fiber 50 are located adjacent to each other to constitute an optical sensor which directs light to the wafer W on the polishing pad 1 and receives reflected light from the wafer W. Thus, in this case, the plurality of distal ends of the illuminating fiber 34 and the plurality of distal ends of the light-receiving fiber 50 constitute a plurality of optical sensors.

Figure 2:
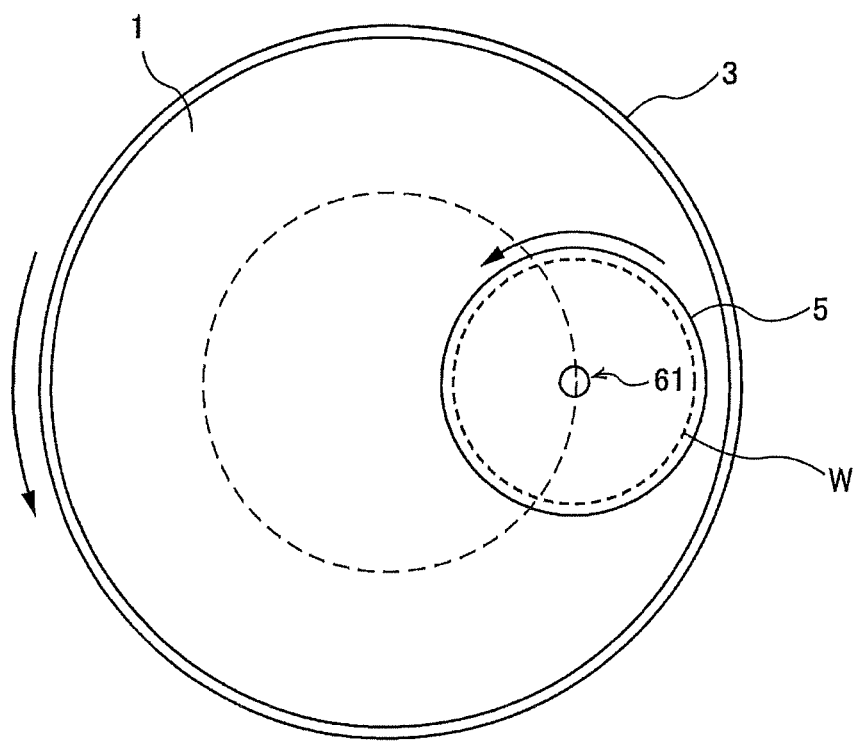
FIG. 2 is a top view of a polishing pad and a polishing table.

FIG. 2 is a top view of the polishing pad 1 and the polishing table 3. The optical sensor 61 sweeps across the wafer W every time the polishing table 3 makes one rotation. In this embodiment, a distance of the optical sensor 61 from the center of the polishing table 3 is equal to a distance from the center of the polishing table 3 to the center of the polishing head 5. Accordingly, each time the polishing table 3 makes one rotation, the optical sensor 61 sweeps across the center of the wafer W while directing the light to the wafer W and receiving the reflected light from the wafer W.

Returning back to FIG. 1, the film thickness measuring device 25 further includes a liquid supply line 62 communicating with the flow passage 7, a gas supply line 63 communicating with the flow passage 7, a liquid supply valve 65 attached to the liquid supply line 62, and a gas supply valve 67 attached to the gas supply line 63. The liquid supply line 62 is coupled to a liquid supply source (not shown) which may be a utility supply source provided in a factory in which the polishing apparatus is installed, while the gas supply line 63 is coupled to a gas supply source (not shown) such as a clean air supply source or a nitrogen gas supply source, which may be a utility supply source provided in the factory. In one embodiment, the liquid supply line 62 is a pure water supply line for supplying pure water.

The liquid supply valve 65 and the gas supply valve 67 are each an actuator-driven valve, such as a solenoid valve, a motor-driven valve, or an air-operated valve. The operations of the liquid supply valve 65 and the gas supply valve 67 are controlled by an operation controller 71. When the operation controller 71 instructs the liquid supply valve 65 to open, a liquid (e.g. pure water) flows through the liquid supply line 62 into the flow passage 7, and comes into contact with the distal end 34a of the illuminating fiber 34 and the distal end 50a of the light-receiving fiber 50, located in the flow passage 7. Similarly, when the operation controller 71 instructs the gas supply valve 67 to open, a gas (e.g. clean air or nitrogen gas) flows through the gas supply line 63 into the flow passage 7, and comes into contact with the distal end 34a of the illuminating fiber 34 and the distal end 50a of the light-receiving fiber 50, located in the flow passage 7. The operation controller 71 and the processor 27 may be constructed integrally.

The film thickness measuring device 25 further includes a fluid discharge line 73 coupled to the flow passage 7. After the liquid and the gas in the flow passage 7 have contacted the distal end 34a of the illuminating fiber 34 and the distal end 50a of the light-receiving fiber 50, the liquid and the gas are discharged from the flow passage 7 through the fluid discharge line 73. The liquid supply line 62, the gas supply line 63, and the fluid discharge line 73 extend through a rotary joint 56.

During polishing of the wafer W, the operation controller 71 manipulates the liquid supply valve 65 and the gas supply valve 67 to supply the liquid and the gas alternately to the flow passage 7. More specifically, the operation controller 71 opens the gas supply valve 67 and closes the liquid supply valve 65 before the distal end 34a of the illuminating fiber 34 and the distal end 50a of the light-receiving fiber 50 reach a position under the wafer W. While the distal end 34a of the illuminating fiber 34 and the distal end 50a of the light-receiving fiber 50 are located under the wafer W, the gas supply valve 67 is kept open and the liquid supply valve 65 is kept closed. The gas is supplied through the gas supply line 63 into the flow passage 7, and comes into contact with the distal end 34a of the illuminating fiber 34, the distal end 50a of the light-receiving fiber 50, and the surface of the wafer W. The gas fills the flow passage 7, and is then discharged from the flow passage 7 through the fluid discharge line 73.

The flow of the gas in the flow passage 7 prevents the slurry from contacting the distal end 34a of the illuminating fiber 34 and the distal end 50a of the light-receiving fiber 50. Since the gas does not dilute the slurry, the film thickness measuring device 25 can measure the film thickness with high accuracy without lowering the polishing rate of the wafer W.

After the distal end 34a of the illuminating fiber 34 and the distal end 50a of the light-receiving fiber 50 have passed across the wafer W, the operation controller 71 closes the gas supply valve 67 and opens the liquid supply valve 65. The liquid is supplied through the liquid supply line 62 into the flow passage 7, and comes into contact with the distal end 34a of the illuminating fiber 34 and the distal end 50a of the light-receiving fiber 50. The liquid fills the flow passage 7, and is then discharged from the flow passage 7 through the fluid discharge line 73. The liquid washes away the slurry that has entered the flow passage 7 and, in addition, prevents evaporation of the slurry on the polishing pad 1. The flow passage 7 is kept clean by the flow of the liquid. Thereafter, the operation controller 71 opens the gas supply valve 67 and closes the liquid supply valve 65 before the distal end 34a of the illuminating fiber 34 and the distal end 50a of the light-receiving fiber 50 reach a position under the wafer W.

According to this embodiment, the gas contacts the distal end 34a of the illuminating fiber 34 and the distal end 50a of the light-receiving fiber 50 when the distal end 34a of the illuminating fiber 34 and the distal end 50a of the light-receiving fiber 50 are located under the wafer W, while the liquid contacts the distal end 34a of the illuminating fiber 34 and the distal end 50a of the light-receiving fiber 50 when the distal end 34a of the illuminating fiber 34 and the distal end 50a of the light-receiving fiber 50 are not located under the wafer W. In this manner, during polishing of the wafer W, the gas and the liquid alternately contact the distal end 34a of the illuminating fiber 34 and the distal end 50a of the light-receiving fiber 50 while performing transmission of light and cleaning of the inside of the flow passage 7 alternately.

In one embodiment, the operation controller 71 may operate the liquid supply valve 65 and the gas supply valve 67 during polishing of the wafer W such that the gas contacts the distal end 34a of the illuminating fiber 34 and the distal end 50a of the light-receiving fiber 50 when the distal end 34a of the illuminating fiber 34 and the distal end 50a of the light-receiving fiber 50 are not located under the wafer W, while the liquid contacts the distal end 34a of the illuminating fiber 34 and the distal end 50a of the light-receiving fiber 50 when the distal end 34a of the illuminating fiber 34 and the distal end 50a of the light-receiving fiber 50 are located under the wafer W.

Figure 3:
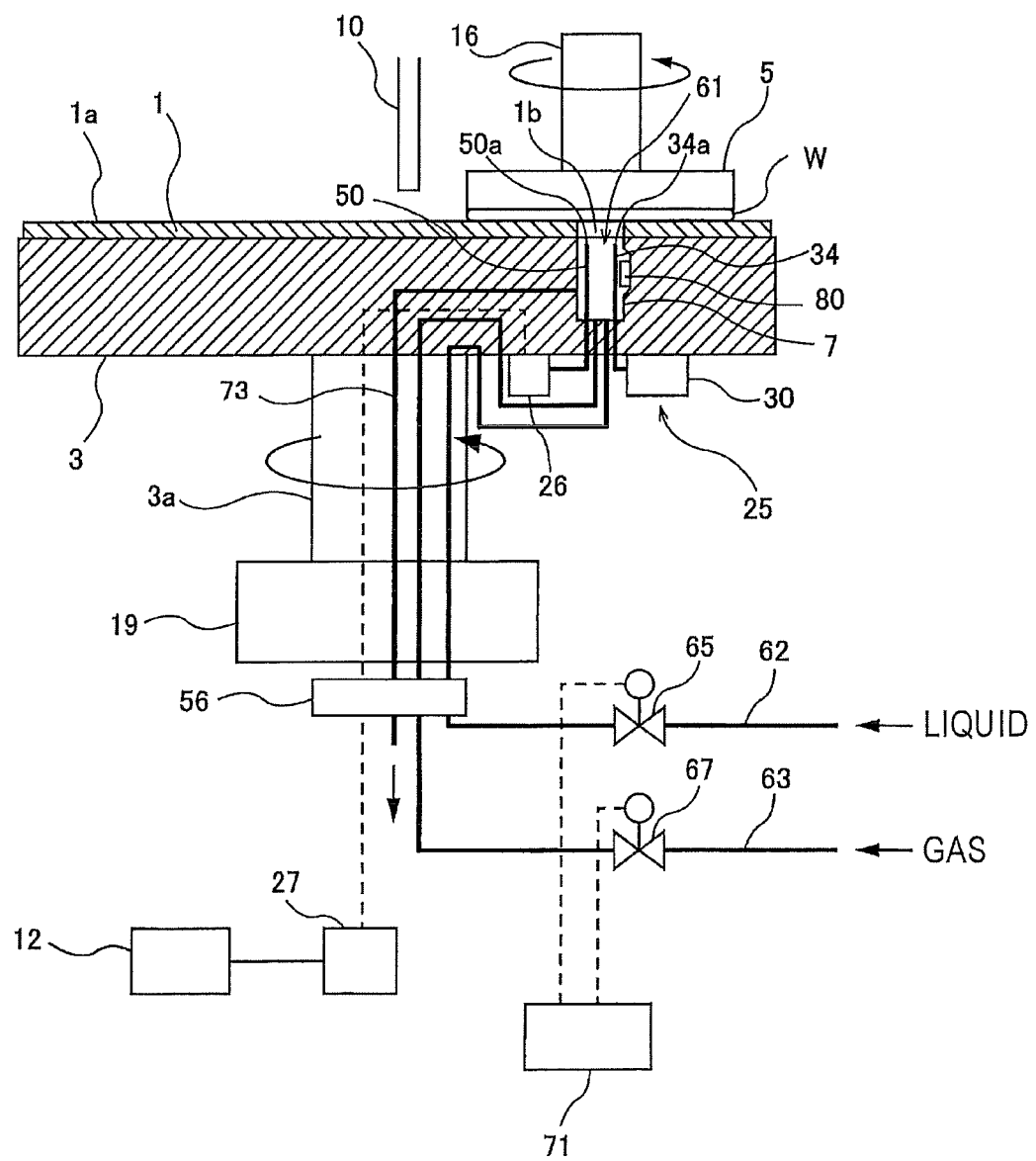
FIG. 3 is a diagram showing another embodiment of a polishing apparatus.

FIG. 3 is a diagram showing another embodiment of a polishing apparatus. The construction of this embodiment, not particularly described here, is the same as that of the embodiment shown in FIG. 1, and a duplicate description thereof is omitted. In this embodiment, an ultrasonic transducer 80 is disposed in the flow passage 7. The ultrasonic transducer 80 is electrically connected to the operation controller 71, and the operation of the ultrasonic transducer 80 is controlled by the operation controller 71.

When the flow passage 7 is filled with the liquid, the liquid is in contact with the ultrasonic transducer 80. When the operation controller 71 instructs the ultrasonic transducer 80 to vibrate, ultrasonic waves propagate through the liquid in the flow passage 7, thereby cleaning the distal end 34a of the illuminating fiber 34 and the distal end 50a of the light-receiving fiber 50. The ultrasonic waves also clean the wall surface that forms the flow passage 7. According to this embodiment, the inside of the flow passage 7, the distal end 34a of the illuminating fiber 34, and the distal end 50a of the light-receiving fiber 50 can be kept clean. This operation ensures accurate measuring of the thickness of the film.

Figure 4:
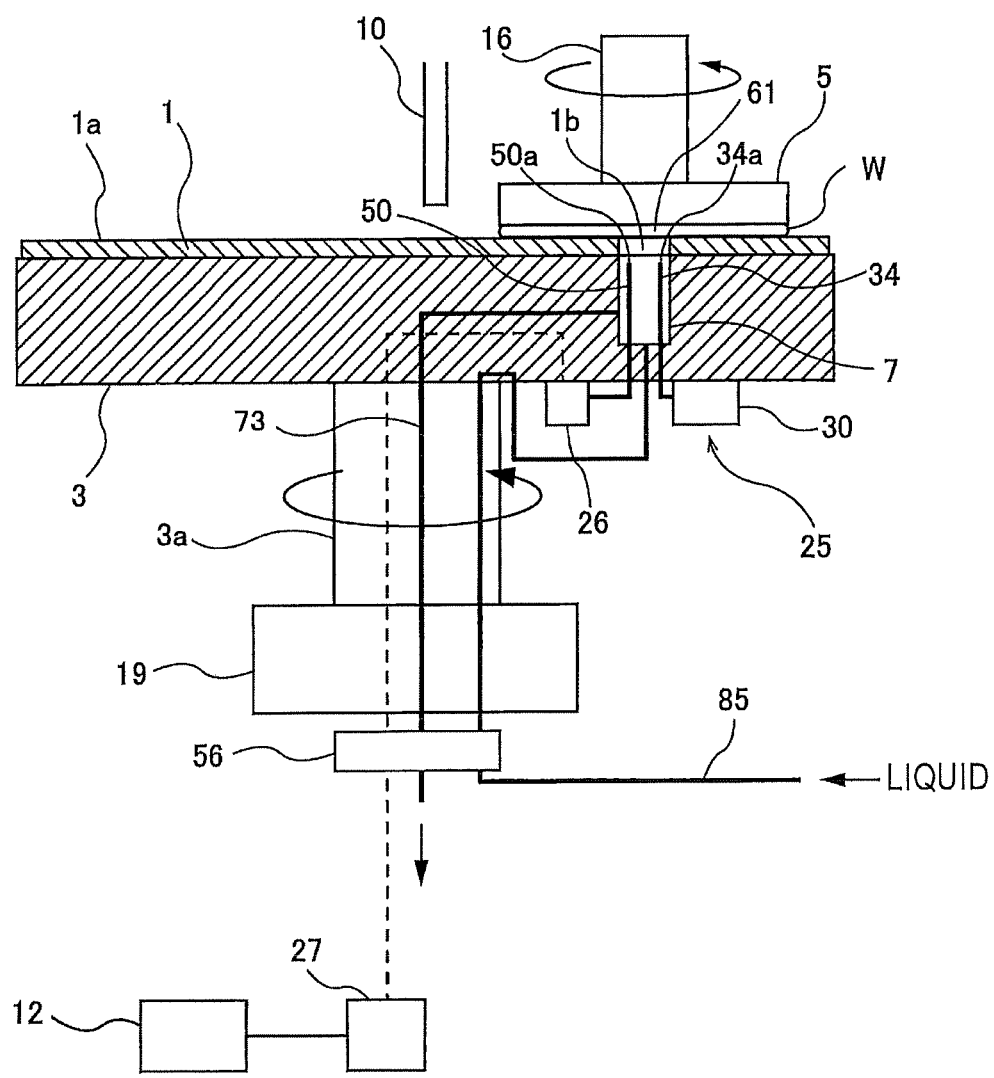
FIG. 4 is a diagram showing another embodiment of a polishing apparatus.

FIG. 4 is a diagram showing another embodiment of a polishing apparatus. The construction of this embodiment, not particularly described here, is the same as that of the embodiment shown in FIG. 1, and a duplicate description thereof is omitted. In this embodiment, the film thickness measuring device 25 includes, instead of the liquid supply line 62, a liquid supply line 85 for supplying a liquid having a higher refractive index than water into the flow passage 7. The film thickness measuring device 25 of this embodiment does not include the gas supply line 63. During polishing of the wafer W, the liquid flows through the liquid supply line 85 into the flow passage 7 and fills the flow passage 7, and is discharged from the flow passage 7 through the fluid discharge line 73.

The liquid having a higher refractive index than water may have a refractive index which is close to that of the core of the light-receiving fiber 50. When such a liquid is in contact with the distal end 50a of the light-receiving fiber 50, the reflected light from the wafer W is transmitted in the light-receiving fiber 50 without a decrease in the quantity of light. Therefore, the spectrometer 26 can accurately measure the intensity of reflected light, and the processor 27 can determine an accurate film thickness of the wafer W.

Figure 5:
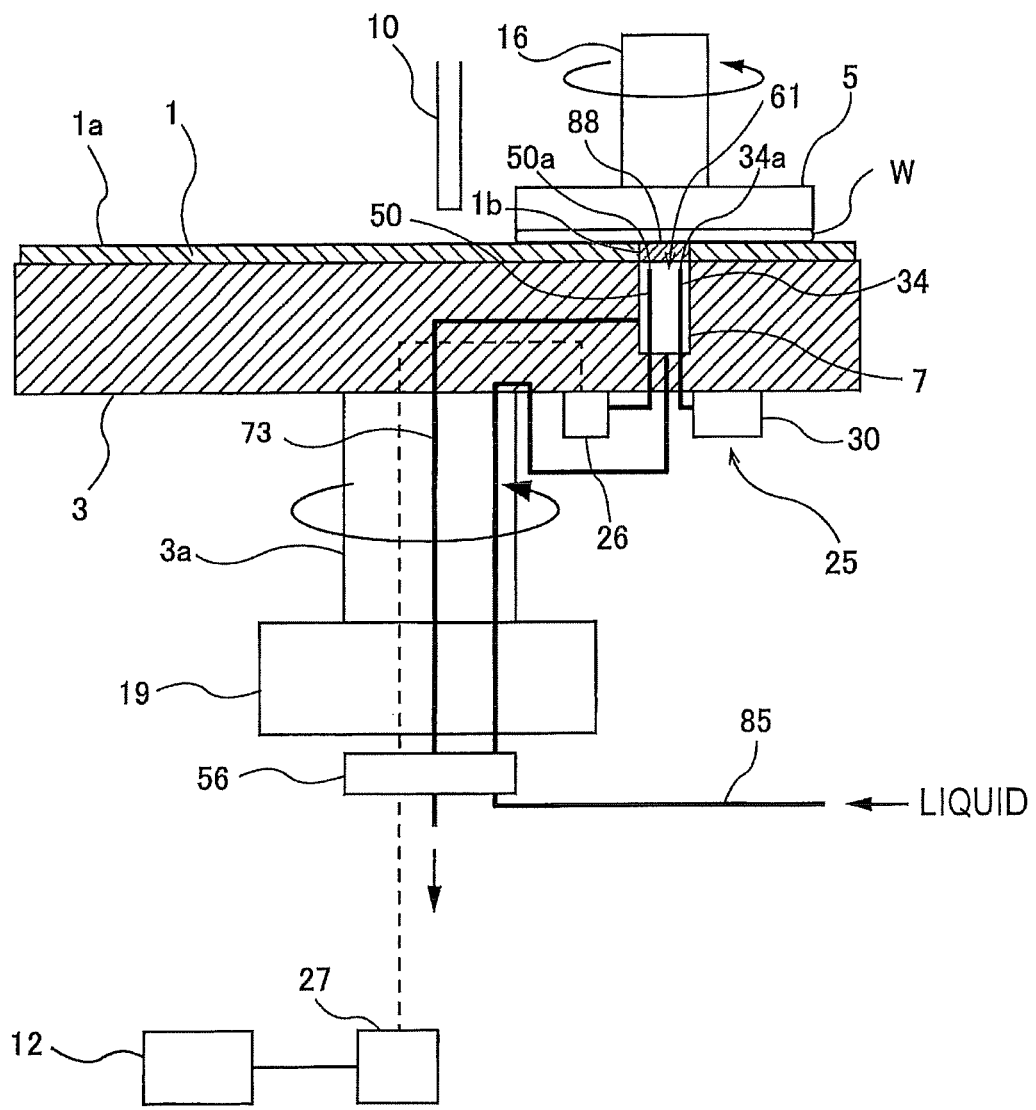
FIG. 5 is a diagram showing an embodiment in which a transparent window is fitted in a through-hole of the polishing pad.

The liquid having a higher refractive index than water is available as a refractive liquid or a contact liquid from, for example, Shimadzu Corporation, Moritex Corporation, or Ocean Optics, Inc. (USA). It may be undesirable for the wafer W to contact some types of liquids. In one embodiment, therefore, a transparent window may be installed in the through-hole 1b of the polishing pad 1. FIG. 5 is a diagram showing the embodiment in which a transparent window 88 is fitted in the through-hole 1b of the polishing pad 1. The construction of this embodiment, not particularly described here, is the same as that of the embodiment shown in FIG. 1, and a duplicate description thereof is omitted.

The flow passage 7 is located under the transparent window 88. The transparent window 88 is made of a material which allows transmission of light. When the flow passage 7 is filled with the liquid that has been supplied through the liquid supply line 85, the light travels from the distal end 34a of the illuminating fiber 34 through the liquid and the transparent window 88, and reaches the surface of the wafer W. The reflected light from the wafer W travels through the transparent window 88 and the liquid, and reaches the distal end 50a of the light-receiving fiber 50. The transparent window 88 prevents the liquid in the flow passage 7 from contacting the wafer W while preventing entry of the slurry into the flow passage 7.

The ultrasonic transducer 80 shown in FIG. 3 can be applied also to the embodiment shown in FIG. 4.

In the embodiments shown in FIGS. 1 through 4, during polishing of the wafer W, light is casted from the illuminating fiber 34 onto the wafer W, and reflected light from the wafer W is received by the light-receiving fiber 50. The reflected light is transmitted to the spectrometer 26. The spectrometer 26 resolves the reflected light in accordance with wavelength and measures the intensity of the reflected light at each of the wavelengths over a predetermined wavelength range, and sends the resulting light intensity data to the processor 27. The light intensity data is an optical signal that reflects the film thickness of the wafer W and is composed of the intensities of the reflected light and the corresponding wavelengths. The processor 27 produces, from the light intensity data, the spectral waveform that represents the intensity of the light at each of the wavelengths.

Figure 6:
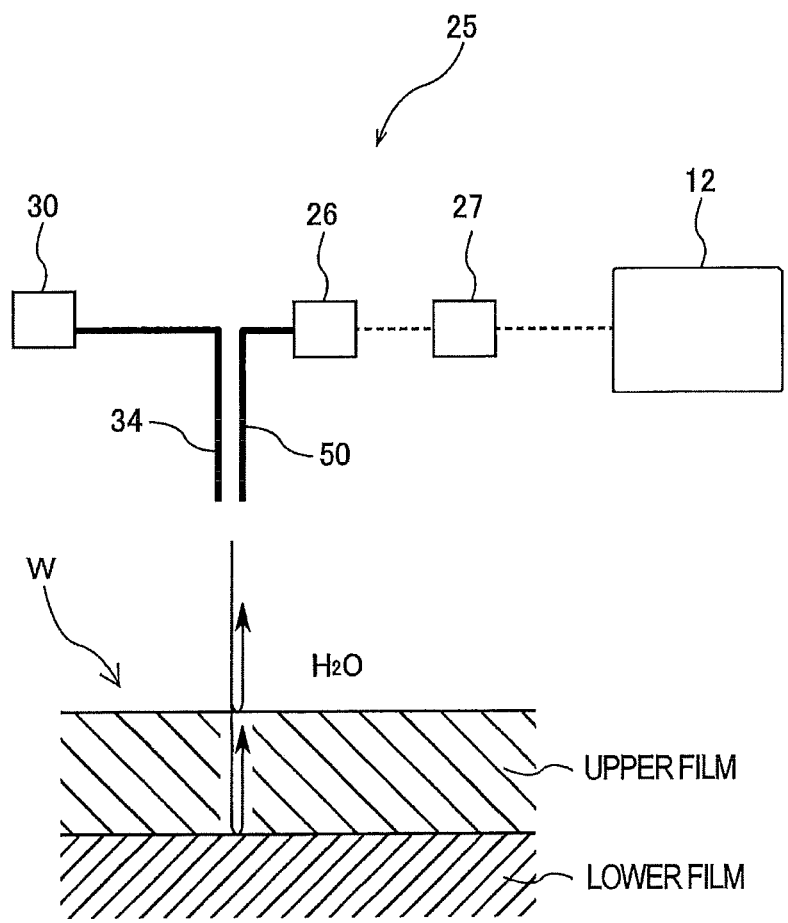
FIG. 6 is a schematic view illustrating the principle of a optical film-thickness measuring device.

FIG. 6 is a schematic view illustrating the principle of the optical film-thickness measuring device 25. In this example shown in FIG. 6, a wafer W has a lower film and an upper film formed on the lower film. The upper film is a film that can allow light to pass therethrough, such as a silicon layer or a dielectric film. The light, directed to the wafer W, is reflected off an interface between a medium (e.g., water in the example of FIG. 6) and the upper film and an interface between the upper film and the lower film. Light waves from these interfaces interfere with each other. The manner of interference between the light waves varies according to the thickness of the upper film (i.e., a length of an optical path). As a result, the spectral waveform, produced from the reflected light from the wafer W, varies according to the thickness of the upper film.

The spectrometer 26 breaks up the reflected light according to the wavelength and measures the intensity of the reflected light at each of the wavelengths. The processor 27 produces the spectral waveform from the reflected-light intensity data (or optical signal) obtained by the spectrometer 26. This spectral waveform is expressed as a line graph indicating a relationship between the wavelength and the intensity of the light. The intensity of the light can also be expressed as a relative value, such as a relative reflectance which will be discussed later.

Figure 7:
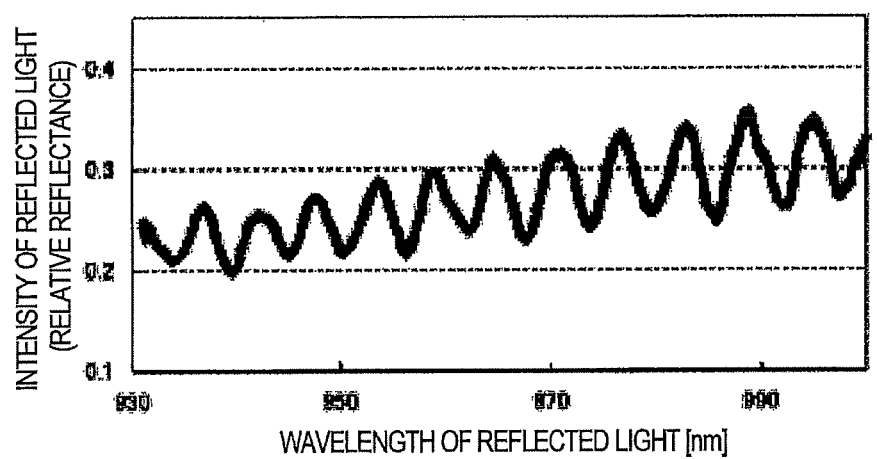
FIG. 7 is a graph showing an example of a spectral waveform.

FIG. 7 is a graph showing an example of the spectral waveform. In FIG. 7, vertical axis represents relative reflectance indicating the intensity of the reflected light from the wafer W, and horizontal axis represents wavelength of the reflected light. The relative reflectance is an index value that represents the intensity of the reflected light. The relative reflectance is a ratio of the intensity of the light to a predetermined reference intensity. By dividing the intensity of the light (i.e., the actually measured intensity) at each wavelength by a predetermined reference intensity, unwanted noises, such as a variation in the intensity inherent in an optical system or the light source of the apparatus, are removed from the actually measured intensity.

The reference intensity is an intensity that has been obtained in advance at each of the wavelengths. The relative reflectance is calculated at each of the wavelengths. Specifically, the relative reflectance is determined by dividing the intensity of the light (the actual intensity) at each wavelength by the corresponding reference intensity. The reference intensity is obtained by directly measuring the intensity of light emitted from the optical sensor 61, or by irradiating a mirror with light from the optical sensor 61 and measuring the intensity of reflected light from the mirror. Alternatively, the reference intensity may be an intensity of the reflected light obtained when a silicon wafer (bare wafer) with no film thereon is being water-polished in the presence of water, or may be an intensity of reflected light from the silicon wafer (bare wafer) measured by the spectrometer 26 when the silicon wafer is placed on the polishing pad 1. In the actual polishing process, a dark level (which is a background intensity obtained under the condition that the light is cut off) is subtracted from the actually measured intensity to determine a corrected actually measured intensity. Further, the dark level is subtracted from the reference intensity to determine a corrected reference intensity. Then the relative reflectance is calculated by dividing the corrected actually measured intensity by the corrected reference intensity. That is, the relative reflectance R(λ) can be calculated by using $$R(\lambda) = \frac{E(\lambda) - D(\lambda)}{B(\lambda) - D(\lambda)}$$

where λ is wavelength, E(λ) is the intensity of the light reflected from the wafer at the wavelength λ, B(λ) is the reference intensity at the wavelength λ, and D(λ) is the background intensity (i.e., dark level) at the wavelength λ obtained under the condition that the light is cut off.

Figure 8:
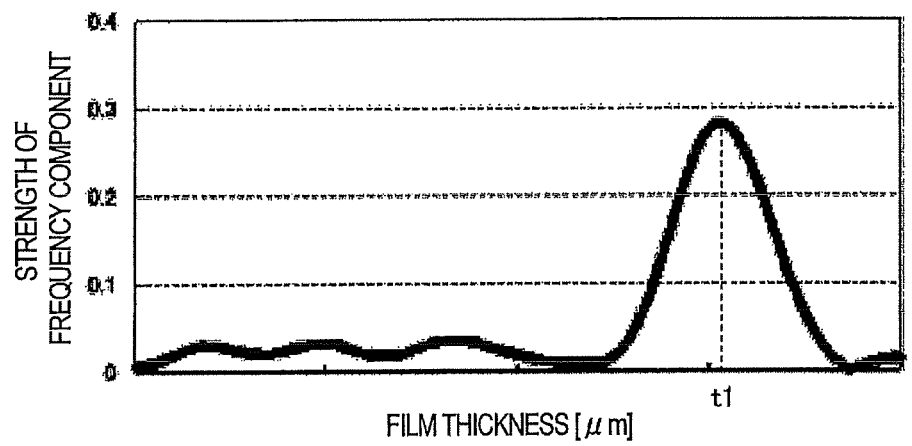
FIG. 8 is a graph showing a frequency spectrum obtained by performing Fourier transform process on the spectral waveform shown in FIG. 7.

The processor 27 performs a Fourier transform process (e.g., fast Fourier transform process) on the spectral waveform to generate a frequency spectrum and determines a film thickness of the wafer W from the frequency spectrum. FIG. 8 is a graph showing the frequency spectrum obtained by performing the Fourier transform process on the spectral waveform shown in FIG. 7. In FIG. 8, vertical axis represents strength of a frequency component contained in the spectral waveform, and horizontal axis represents film thickness. The strength of a frequency component corresponds to amplitude of a frequency component which is expressed as sine wave. A frequency component contained in the spectral waveform is converted into a film thickness with use of a predetermined relational expression, so that the frequency spectrum as shown in FIG. 8 is generated. This frequency spectrum represents a relationship between the film thickness and the strength of the frequency component. The above-mentioned predetermined relational expression is a linear function representing the film thickness and having the frequency component as variable. This linear function can be obtained from actual measurement results, an optical film-thickness measurement simulation, etc.

In the graph shown in FIG. 8, a peak of the strength of the frequency component appears at a film thickness t1. In other words, the strength of the frequency component becomes maximum at the film thickness of t1. That is, this frequency spectrum indicates that the film thickness is t1. In this manner, the processor 27 determines the film thickness corresponding to a peak of the strength of the frequency component.

The processor 27 outputs the film thickness t1 as a film-thickness measurement value to the polishing controller 12. The polishing controller 12 controls polishing operations (e.g., a polishing terminating operation) based on the film thickness t1 sent from the processor 27. For example, if the film thickness t1 reaches a preset target value, the polishing controller 12 terminates polishing of the wafer W.

The signal representing the film thickness of the wafer W detected by the optical film-thickness measuring device 25 may be transmitted to a host computer, and may be stored in the host computer. The host computer is a computer which is coupled to multiple semiconductor manufacturing apparatuses so as to manage these apparatuses. The host computer may detect an end point of the polishing of the wafer W based on the signal representing the film thickness of the wafer W that has been sent from the polishing apparatus, and may transmit an end point detection signal to the polishing controller 12 of the polishing apparatus.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims.

What is claimed is:

1. A polishing apparatus comprising:
   a polishing table for supporting a polishing pad, the polishing table being rotatable;
   a polishing head configured to press a wafer against the polishing pad;
   a light source configured to emit light;
   an illuminating fiber coupled to the light source and having a distal end disposed in a flow passage formed in the polishing table;
   a spectrometer configured to resolve reflected light from the wafer in accordance with wavelengths and measure an intensity of the reflected light at each of the wavelengths;
   a light-receiving fiber coupled to the spectrometer and having a distal end disposed in the flow passage;
   a processor configured to determine a film thickness of the wafer based on a spectral waveform indicating a relationship between intensity and wavelength of the reflected light;
   a liquid supply line communicating with the flow passage;
   a gas supply line communicating with the flow passage;
   a liquid supply valve attached to the liquid supply line;
   a gas supply valve attached to the gas supply line; and
   an operation controller configured to instruct the gas supply valve to open and instruct the liquid supply valve to close when the light-receiving fiber receives the reflected light from the wafer and when the polishing head presses the wafer against the polishing pad in each rotation of the polishing table, the operation controller being further configured to instruct the gas supply valve to close and instruct the liquid supply valve to open when the light-receiving fiber does not receive the reflected light from the wafer and when the polishing head presses the wafer against the polishing pad in each rotation of the polishing table.

2. The polishing apparatus according to claim 1, further comprising an ultrasonic transducer disposed in the flow passage.

3. The polishing apparatus according to claim 1, wherein the operation controller is further configured to instruct the gas supply valve to open and close alternatively each time the polishing table makes one rotation.

* * * * *